United States Patent [19]

Schaft et al.

[11] 4,020,316

[45] Apr. 26, 1977

[54] METHOD AND APPARATUS FOR POSITIONING NUTS TO BE WELDED TO A BASE

[75] Inventors: Edwin E. Schaft, Berea; Kenneth A. Yeager, Olmsted Falls, both of Ohio

[73] Assignee: Fastener Industries Inc., Cleveland, Ohio

[22] Filed: Aug. 22, 1975

[21] Appl. No.: 606,873

[52] U.S. Cl. .............................. 219/103; 219/93; 219/107; 219/119

[51] Int. Cl.² ........................................ B23K 11/02

[58] Field of Search ............ 219/119, 93, 103, 107

[56] References Cited

UNITED STATES PATENTS

| 2,006,458 | 7/1935 | Jones | 219/93 |
|---|---|---|---|
| 2,623,974 | 12/1952 | Prucha | 219/93 |
| 2,731,535 | 1/1956 | Grey | 219/119 |
| 3,453,410 | 7/1969 | Amann | 219/103 |
| 3,573,423 | 4/1971 | Medlin | 219/119 |

Primary Examiner—E. A. Goldberg

Attorney, Agent, or Firm—Bosworth, Sessions & McCoy

[57] ABSTRACT

A method and apparatus for positioning nuts to be welded to a base such as a steel sheet. The base is located between a pair of relatively movable welding electrodes, one of which has a retractable nut supporting and locating pin with a tapered shoulder, the pin being movable in the electrode and extending from its contact face. A nut is placed on the pin and locked onto the tapered shoulder. As the electrodes move together to a welding position the supporting and locating pin is depressed so that the nut comes into engagement with the contact face of the respective electrode. The nut is consequently freed from its taper lock on the supporting and locating pin as it is pressed against the base by the contact face of the respective electrode. Welding current is then passed between the electrodes through the nut and the base to weld the nut in place.

7 Claims, 8 Drawing Figures

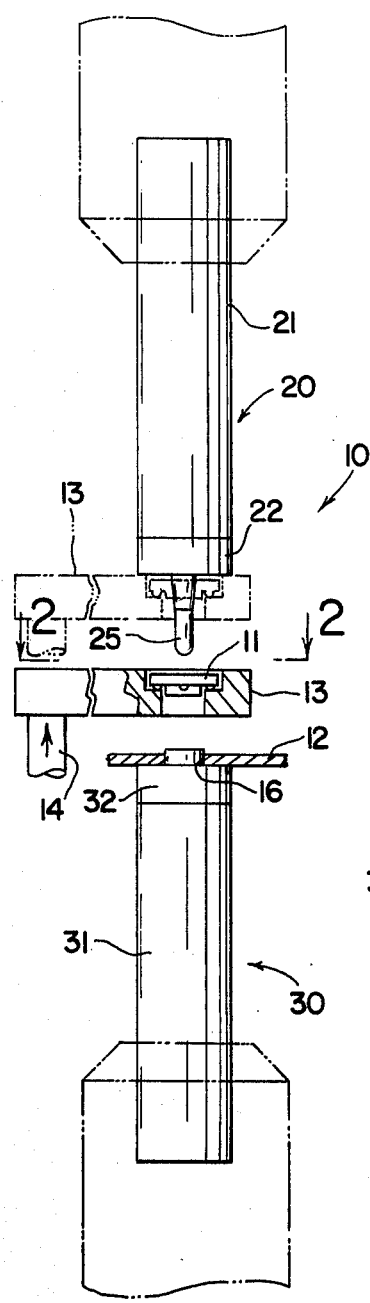
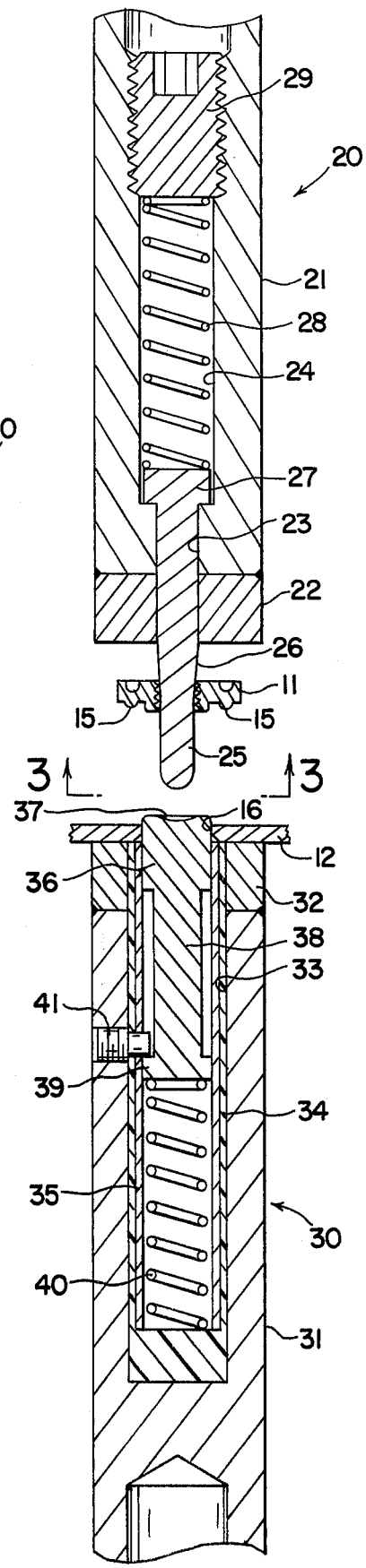
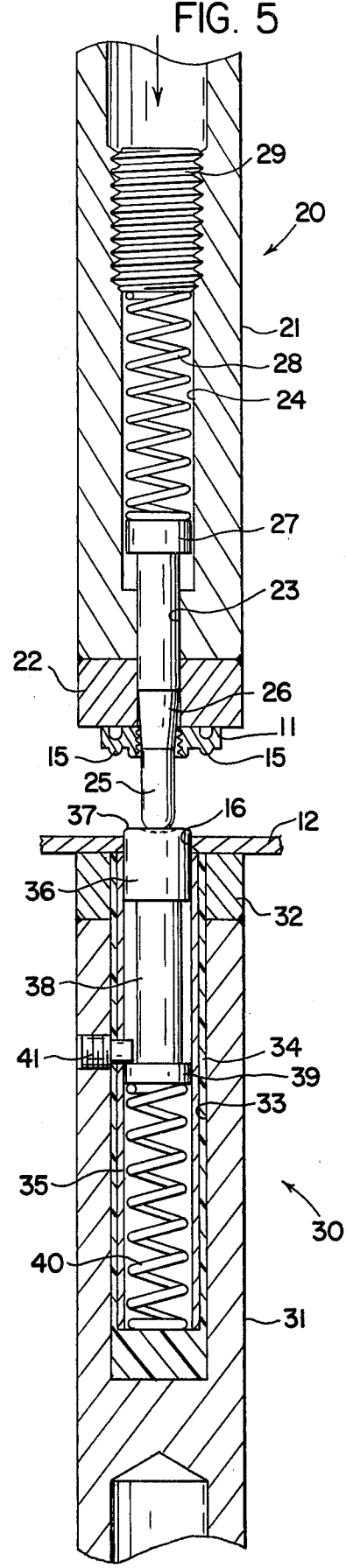
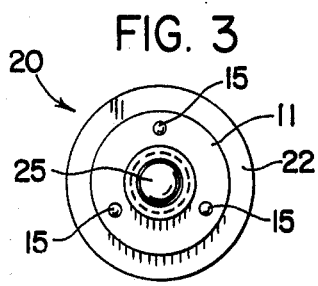
FIG. 1
FIG. 4
FIG. 5
FIG. 3

FIG. 8
FIG. 6
FIG. 7
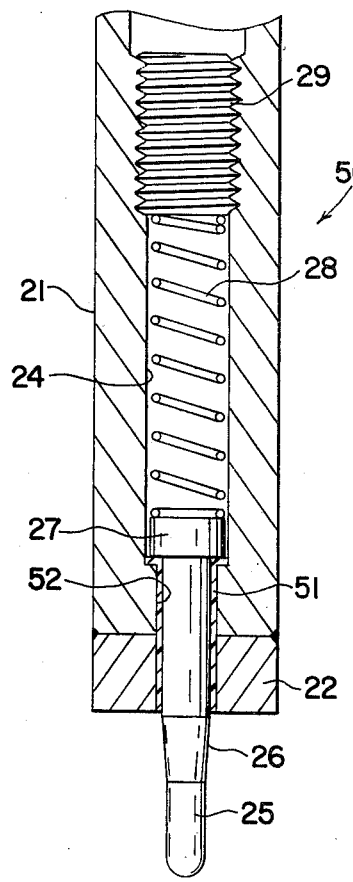
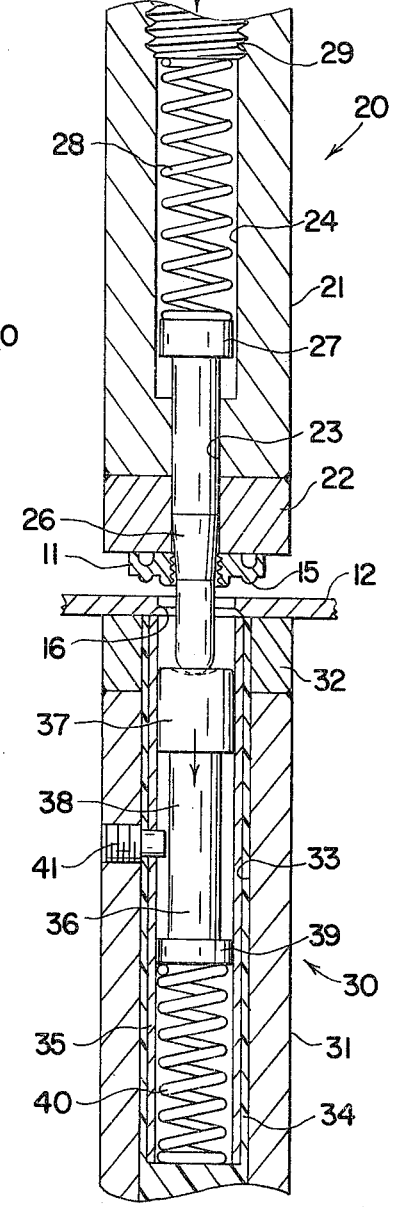
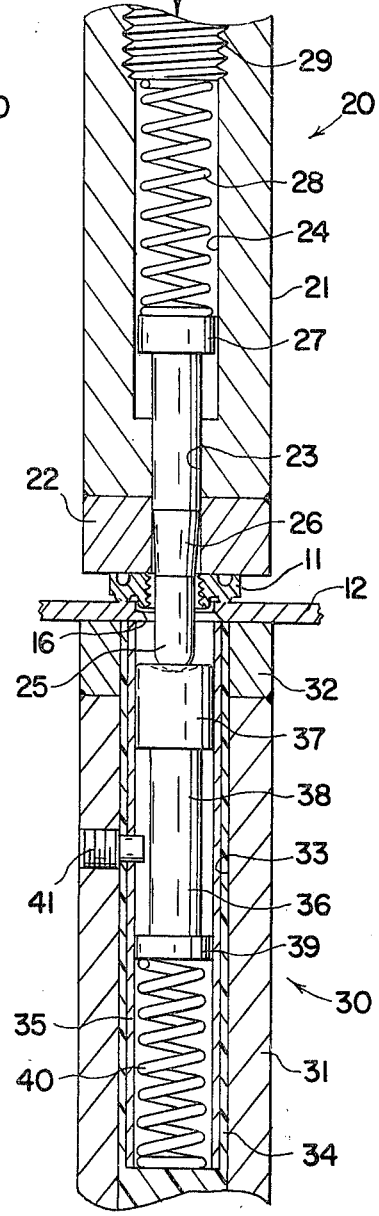
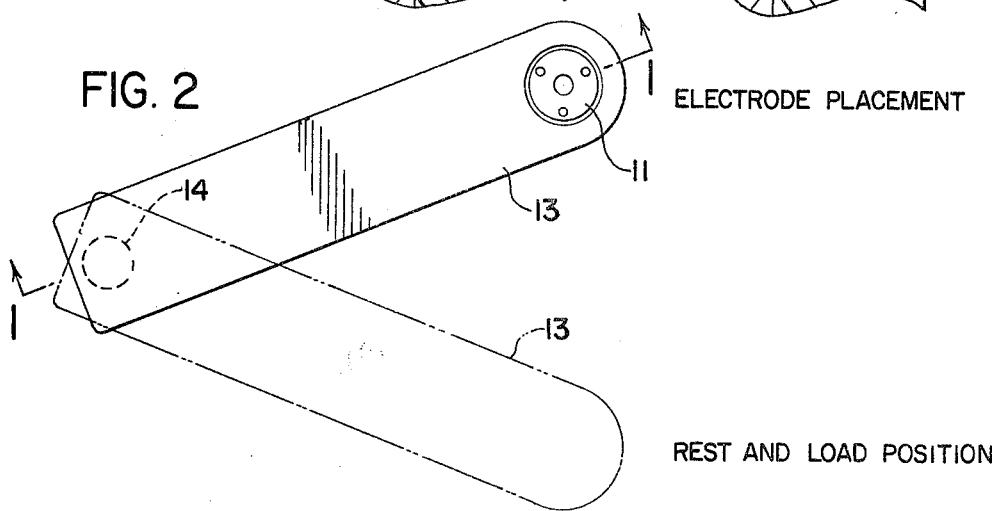
FIG. 2
ELECTRODE PLACEMENT
REST AND LOAD POSITION

METHOD AND APPARATUS FOR POSITIONING NUTS TO BE WELDED TO A BASE

BACKGROUND OF THE INVENTION

This invention relates to electrical resistance welding and especially to the welding of nuts (commonly called weld nuts) to a base such as a steel sheet. More particularly, the invention relates to a weld nut supporting and locating device operatively associated with one of the two electrodes, for accurately positioning the nut on the base in proper alignment with the base and the respective electrodes prior to the welding operation.

Weld nuts are commonly attached to sheet metal by resistance welding, usually over an opening in the sheet metal to permit a screw or other fastener to extend through the sheet and into the internal threads of the nut. The weld nuts are usually provided with small projections that rest against one side of the sheet. A pair of opposed welding electrodes come together and engage the sheet and nut respectively positioned therebetween, after which welding current is passed between the electrode contact faces through the nut and metal sheet to heat the projections and weld the projections to the sheet. When the sheet metal has an opening to be aligned with the threaded aperture in the weld nut, one of the electrodes may have a pilot pin for the purpose of properly locating the base sheet relative to electrodes and weld nuts.

One means for properly locating the weld nut relative to the electrodes and the metal sheet is disclosed in U.S. Pat. No. 3,573,423 wherein a vacuum technique is used to hold the weld nut on a movable electrode as the electrode is moved into welding position carrying the nut therewith.

Still another means for attaching weld nuts is disclosed in U.S. Pat. No. 2,731,535 wherein a weld nut is located over an opening in the sheet metal by a centering element located in the lower electrode that contacts the sheet. The centering element has a pilot that extends vertically upward through the sheet and into the aperture in the nut and thereby positions the nut prior to the welding operation. Both of the above techniques are effective for attaching weld nuts to sheet metal, however, they each have certain disadvantages such as limitations as to speed of operation, etc.

The method and apparatus of the present invention provide an improved means for carrying and positioning a weld nut prior to its attachment to a base, and afford other features and advantages not obtainable from the prior art.

SUMMARY OF THE INVENTION

It is among the objects of the invention to transport a weld nut along with one of a pair of opposed welding electrodes to a predetermined position on a sheet metal base and in proper alignment with the sheet metal and the electrodes prior to the welding operation.

This and other objects and advantages are achieved by the method and apparatus of the invention, the apparatus comprising a pair of welding electrode assemblies with opposed contact faces and movable relative to one another between a welding position forming electrical welding contact therebetween through a base and a weld nut, and a spaced apart position for receiving the respective parts to be welded. One of the electrode assemblies is adapted for welding contact with the nut and the other with the base member, the one electrode assembly having a central bore extending inward from its contact face and having a nut carrying and locating pin slidably received therein and adapted to extend through and grip a weld nut loaded thereon.

The carrying and locating pin is movable between an outwardly extending nut receiving position and a retracted nut releasing position within the electrode assembly. A spring means urges the carrying and locating pin to its extended position so that when the electrode asemblies move relatively toward one another, the pin is depressed against the spring means and retracts into the electrode assembly, thus freeing the nut.

Accordingly, the nut is placed, during movement of the respective electrode assembly into welding position, against the contact face of the electrode assembly and as a result, the nut is pressed against the base between the two electrode assemblies while welding current is applied.

The nut carrying and locating pin retains the nut thereon during movement of the electrode assembly by means of a tapered shoulder on the pin against which the nut is seated and retained by a taper lock. During retraction of the pin the tapered shoulder portion is forced into the electrode assembly and that movement by the pin moves the nut into engagement with the contact fact of the electrode.

According to the preferred embodiment, the other electrode assembly is provided with a spring-loaded pilot pin adapted to extend through an opening in the base around which the nut is to be welded. The spring means that biases the pilot pin of the lower electrode assembly has a greater force than the spring means biasing the carrying and locating pin so that the pilot pin is not depressed until after substantial retraction of the carrying and locating pin into the upper electrode assembly.

According to the method of the invention which resides essentially in the operation of apparatus of the type described above, a nut or other fastener with an opening therein is positioned and gripped by one of two welding electrode assemblies and between the same, the two electrode assemblies being movable relative to one another between a welding position and a retracted work receiving position. One of the electrode assemblies has a contact face that engages the base and the other carries the gripped nut forward toward the base and then releases it while at the same time pressing it against the base. The nut is then welded by the electrode assemblies to the base.

BRIEF DESCRIPTION OF THE DRAWINGS

FIG. 1 is a broken elevational view partly in section, illustrating a resistance welding apparatus embodying the invention with an associated weld nut loading mechanism for placing nuts in the apparatus between welding operations;

FIG. 2 is a plan view taken from the line 2—2 of FIG. 1, illustrating the nut loading mechanism, the mechanism being shown in its nut placement position (between the electrodes) in solid lines and pivoted to its rest and load position (away from the electrodes) in dashed lines;

FIG. 3 is a view taken on the line 3—3 of FIG. 4, between the two electrodes of the welding apparatus;

FIGS. 4 through 7 are fragmentary central longitudinal sectional views on an enlarged scale of the apparatus of FIG. 1, illustrating sequentially the operation of the welding apparatus of the invention; and FIG. 8 is a fragmentary central longitudinal sectional view on the same scale as FIGS. 4 to 7 illustrating an alternate form of upper electrode construction for the apparatus of the invention.

DESCRIPTION OF THE PREFERRED EMBODIMENT

Referring more particularly to the drawings and initially to FIG. 1 there is shown a portion of an electrical resistance welding apparatus broadly indicated by the numeral 10, adapted to weld a nut 11 to a steel sheet 12. Nuts 11 are fed either manually or through an automatic feed device, for example, to the apparatus 10 between welding operations.

A typical mechanism for placing welding nuts in the apparatus 10 is illustrated in FIGS. 1 and 2 which show a pivotal nut loading arm 13 connected to and adapted for pivotal movement about a shaft 14. The loading arm 13 has two basic movements including a pivotal movement between a rest and load position indicated in dashed lines in FIG. 2 whereat the arm 13 remains during the welding operation, and a nut placing position indicated in solid lines in FIG. 2. Once the arm 13 is in its nut placing position, it is raised upwardly to place the nut 11 in a positively retained position in the loading apparatus 10 as illustrated in dashed lines in FIG. 1. After placement of the nut 11, the arm 13 is lowered and pivoted to the position shown in dashed lines in FIG. 2.

Each nut 11 is provided with three protruberances 15 that are adapted to bear against the steel sheet 12 and provide a resistive path of current flow. The resulting heat welds the nut 11 to the sheet 12. The sheet 12 is provided with an aperture 16 with which the weld nut 11 is aligned.

The apparatus 10 includes a movable upper electrode assembly 20 and a stationary lower electrode assembly 30, the upper electrode assembly 20 being adapted for reciprocating movement toward and away from the stationary electrode assembly 30 between the position illustrated in FIG. 1 permitting location of the steel sheet 12 and loading of the nut 11, and an operating position shown in FIG. 7.

The upper electrode assembly 20 includes a body 21 (preferably formed of copper, for example) and a welding tip 22 (formed of wear resistant conductive metal) which is anchored to the body 21.

Referring to FIGS. 4 through 7 it will be seen that the forward end of the body 21 and tip 22 of the electrode assembly 20 have a bore 23 formed therein with a counterbore 24 extending from the rearward end to form a shoulder. A nut carrying and locating pin 25 is slidably received in the bore 23 and is provided with a tapered shoulder portion 26 intermediate its ends which provides a retaining means for the nut 11. When the weld nut 11 is loaded, it is pushed on to the tapered shoulder to provide a tight taper lock sufficient to retain the nut 11 thereon. The pin 25 has a head 27 located within the counterbore 24 and adapted, when the pin 25 is in its extended position, to bear against the shoulder between the counterbore 24 and the bore 23. The pin 25 is urged to its extended position (FIGS. 1 and 4) by a helical spring 28 located in the counterbore 24 and which bears between the head 27 of the pin 25 and a set screw 29 which is threaded into the rearward end of the body 21. Accordingly, the tension of the helical spring 28 may be adjusted with the set screw 29. The pin 25 is preferably formed of stainless steel or other non-magnetic material to prevent pick-up of metal particles.

The stationary lower electrode assembly 30 has a cylindrical body 31 (preferably formed of copper) with a welding tip 32 (preferably formed of the same material as the tip 22) anchored to its forward end and has a central bore 33 that receives an insulating element 34 formed of non-conductive material. Located within the insulating element 34 is a cylindrical sleeve 35 that receives a pilot pin 36 for use in locating the steel sheet 12 with the particular aperture 16 aligned with the nut 11 and the electrode assemblies 20 and 30. The pilot pin 36 has a head 37 adapted to protrude slightly through the aperture 16 in the steel sheet 12 when the steel sheet is properly positioned, and a central neck portion 38 of reduced diameter intermediate the ends.

The lower end of the pilot pin 36 has a flanged portion 39 engaged by a helical spring 40 that biases the pilot pin to its upward position. The movement of the pilot pin 30 is limited by a set screw 41 that extends laterally through the body 31 and into the space adjacent the neck portion 38 of the pilot pin 36.

The force exerted by the spring 40 is greater than the force of the spring 28 so that when the electrode assembly 20 lowers into welding position the pin 36 first depresses the spring 28 to permit substantial retraction movement of the pin 25 before any depression of the pilot pin 36 occurs.

OPERATION

The operation of the apparatus 10 is best illustrated with reference to FIGS. 4 through 7 which show sequentially the relative positions of the electrode assemblies 20 and 30 during the carrying of the weld nut 11 into the desired position and the locating thereof against the steel sheet 12. The operation will be described beginning with the condition illustrated in FIG. 1 after the weld nut has been loaded onto the pin 25 and is tightly retained thereon by means of the taper lock described above. With the weld nut 11 so retained, the downward movement of the upper electrode assembly 20 is begun as illustrated in FIG. 4.

It will be noted that the steel sheet 12 has been placed on the contact face of the welding tip 32 and with the aperture 16 properly aligned by means of the pilot pin 36 which extends slightly through the aperture 16. Also, the nut 11 in its taper lock position is spaced slightly below the contact face of the welding tip 22.

As the upper electrode assembly 20 continues to move downward, the pin 25 engages the head 37 of the pilot pin 36 as illustrated in FIG. 5. Since the force of the spring 40 is greater than the force exerted by the spring 28, the pin 25 retracts in the bore 23 and depresses the spring 28. This brings the weld nut 11 against the contact face of the welding tip 22 (FIG. 5).

Referring next to FIG. 6, it will be seen that after preliminary compression of the spring 28, its force is sufficient to overcome the force of the spring 40 and the pin 23 forces the pilot pin 36 downward below the aperture 16 in the steel sheet 12. Also, the further retraction of the pin 25 brings the tapered shoulder portion 26 within the bore 23 and thus frees the taper lock between the weld nut 11 and the pin 25.

Further downward movement of the upper electrode assembly 20 brings the weld nut 11 into aligned position with the protruberances 16 against the steel sheet as illustrated in FIG. 7. With the electrode assemblies 20 and 30 in this condition, welding current is passed between contact faces of the welding tips 22 and 32 and thus through the weld nut 11 and steel sheet 12 to weld the nut 11 in position.

FIG. 8

FIG. 8 shows a modified form 50 of the upper electrode assembly of the invention wherein some of the various parts are identified by the same numerals used to identify like parts in the embodiment of FIGS. 1 to 7. The embodiment of FIG. 8 differs from the embodiment of FIGS. 1 to 7 in that an insulating sleeve 51 is provided between the pin 25 and the surrounding wall of the bore 52 in which the pin slides. The insulating sleeve 51 may be desirable in some circumstances to prevent short circuiting of welding current through the pin 25.

It will be apparent that the upper electrode assembly 20 (or 50) may be adapted for many different sizes of weld nuts 11 merely by changing the size of the pin 25. The pin 25, however, by virtue of the tapered shoulder 26 will accommodate a certain range of weld nut sizes without any chaning of parts. Where larger nuts are to be used, however, a replacement electrode may be provided with a pin of larger size than the pin 25.

While the invention has been shown and described with respect to specific embodiments of the method and apparatus thereof, this is intended for the purpose of illustration rather than limitation and other modifications and variations of the specific forms herein shown and described will be apparent to those skilled in the art all within the spirit and scope of the invention. Accordingly, the patent is not to be limited in scope and effect to the specific embodiments herein shown and described nor in any other way that is inconsistent with the extent to which the progress in the art has been advanced by the invention.

We claim:

1. A welding apparatus for positioning and welding a nut or the like on a base, comprising a pair of electrode assemblies having opposed contact faces and movable relative to one another between an inward welding position forming electrical welding contact therebetween through said base and said nut, and an outward position, one of said electrode assemblies being adapted for welding contact with said base and the other electrode assembly being adapted for welding contact with said nut, said other electrode assembly having a central bore in its contact face, a nut carrying and locating member slidably received in said base and adapted to extend through and grip a nut positioned thereon, through frictional engagement preventing movement of said nut in an axial direction relative to said member, said member being movable between an outwardly extending nut receiving and carrying position and a retracted nut releasing position within said other electrode assembly to accommodate welding contact between said electrode contact face and said nut when said nut is positioned by said member on said base, spring means urging said member to its extended position, whereby when said electrode assemblies move relatively toward one another said member is depressed against said spring means during positioning of said nut on said base until said member releases said nut from frictional engagement with said member as said nut is positioned on said base for contact by said contact face of said other electrode assembly.

2. Apparatus as defined in claim 1 wherein said carrying and locating pin has a tapered shoulder formed thereon cooperable with said nut to provide a taper lock with said nut to retain said nut on said carrying and locating pin.

3. Apparatus as defined in claim 1 wherein said electrode assembly adapted for welding contact with said base has a central bore in its contact face and a pilot pin slidably received in said base and adapted to extend into an aperture in said base for locating said aperture relative to said nut.

4. Apparatus as defined in claim 3 wherein said pilot pin is retractable into said electrode assembly adapted for welding contact with said base, and including spring means urging said pilot pin to an extended position.

5. Apparatus as defined in claim 4 wherein said pilot pin is aligned with and engages said carrying and locating pin when said electrode assemblies are moved to their welding position.

6. Apparatus as defined in claim 5 wherein said spring means urging said pilot pin has a stronger force than said spring means urging said carrying and locating pin whereby said carrying and locating pin retracts before said pilot pin.

7. A method for positioning and welding a nut or the like on a base comprising the steps of:
    positioning said base between two electrode assemblies movable relative to one another between an extended position and a retracted position,
    contacting said base with one of said electrode assemblies,
    positioning and gripping a nut on carrying and locator means extending through said nut and supported by said other electrode assembly so that frictional engagement between said carrying and locator means and said nut prevents axial movement of said nut relative to said means,
    moving said other electrode toward said base, releasing said nut from frictional engagement with said carrying and locator means as said nut is positioned on said base, and
    thereafter passing welding current through said nut and said base to weld said nut to said base.

* * * * *